United States Patent
Sjöqvist (10) Patent No.: US 9,689,312 B2
(45) Date of Patent: Jun. 27, 2017

(54) GAS TURBINE ENGINE COMPONENT

(75) Inventor: Roger Sjöqvist, Trollhättan (SE)

(73) Assignee: GKN Aerospace Sweden AB, Trollhattan (SE)

( * ) Notice: Subject to any disclaimer, the term of this patent is extended or adjusted under 35 U.S.C. 154(b) by 293 days.

(21) Appl. No.: 14/366,644

(22) PCT Filed: Dec. 22, 2011

(86) PCT No.: PCT/SE2011/000243
§ 371 (c)(1),
(2), (4) Date: Oct. 2, 2014

(87) PCT Pub. No.: WO2013/095209
PCT Pub. Date: Jun. 27, 2013

(65) Prior Publication Data
US 2015/0033759 A1    Feb. 5, 2015

(51) Int. Cl.
*F02C 7/20*    (2006.01)
*F01D 25/24*    (2006.01)
(Continued)

(52) U.S. Cl.
CPC ............... *F02C 7/20* (2013.01); *F01D 9/041* (2013.01); *F01D 25/16* (2013.01); *F01D 25/162* (2013.01);
(Continued)

(58) Field of Classification Search
CPC ........ F02C 7/20; F01D 25/243; F01D 25/246; F01D 25/24; F01D 25/28
See application file for complete search history.

(56) References Cited

U.S. PATENT DOCUMENTS 5,483,792 A    1/1996    Czachor et al.
2004/0103534 A1    6/2004    Lundgren et al.
(Continued)

FOREIGN PATENT DOCUMENTS

EP    0344877 A1    12/1989
EP    1247944 A2    9/2002
(Continued)

OTHER PUBLICATIONS

Extended European Search Report for EP Application No. 11878063.4 dated Oct. 29, 2015 (4 pages).
(Continued)

*Primary Examiner* — Pascal M Bui Pho
*Assistant Examiner* — Thuyhang Nguyen
(74) *Attorney, Agent, or Firm* — Bejin Bieneman PLC (57) ABSTRACT

The invention concerns a gas turbine engine component (27) comprising an outer ring (21), an inner ring (20), a plurality of circumferentially spaced elements (22) extending between the inner ring (20) and the outer ring (21), wherein an annular load transfer structure (23) extends circumferentially along an inner side of the inner ring (20) and also inwards in a radial direction of the component (27). The first portion (23a), at least along a part of the circumference, is inclined in the radial direction in relation to a second portion (23b), wherein the two inclined portions (23a, 23b) are connected in a connection zone (26) between the inclined portions (23a, 23b), and wherein a radial and/or axial position of the connection zone (26) varies along the circumference such that the radial/axial position of the connection zone in a location that circumferentially corresponds to a first element (22a), i.e. in a first circumferential location (A), is radially and/or axially different from the radial/axial position of the connection zone (26) in-between the first
(Continued)

element (22a) and an adjacent second element (22b), i.e. in a second circumferential location (B).

14 Claims, 8 Drawing Sheets

(51) Int. Cl.
  *F01D 25/28* (2006.01)
  *F01D 25/16* (2006.01)
  *F01D 9/04* (2006.01)
  *F02C 7/06* (2006.01)

(52) U.S. Cl.
  CPC ........... *F01D 25/24* (2013.01); *F01D 25/243* (2013.01); *F01D 25/246* (2013.01); *F01D 25/28* (2013.01); *F02C 7/06* (2013.01); *Y02T 50/671* (2013.01); *Y02T 50/673* (2013.01)

(56) References Cited

U.S. PATENT DOCUMENTS

| | | | |
|---|---|---|---|
| 2007/0231134 A1* | 10/2007 | Kumar | ................ F01D 25/162 415/229 |
| 2008/0022692 A1 | 1/2008 | Nagendra et al. | |
| 2008/0134687 A1 | 6/2008 | Kumar et al. | |
| 2009/0101787 A1 | 4/2009 | Dierberger | |
| 2009/0142182 A1 | 6/2009 | Kapustka | |
| 2010/0132371 A1* | 6/2010 | Durocher | ................ F01D 9/065 60/796 |

FOREIGN PATENT DOCUMENTS

| | | |
|---|---|---|
| EP | 1482130 | 12/2004 |
| EP | 1845237 | 10/2007 |
| EP | 1930555 | 6/2008 |
| EP | 2148046 | 1/2010 |
| EP | 2233697 A2 | 9/2010 |
| GB | 918692 A | 2/1963 |
| GB | 2226086 A | 6/1990 |
| GB | 2226600 A | 7/1990 |
| WO | 2004016911 A1 | 2/2004 |
| WO | 2005012696 A1 | 2/2005 |
| WO | 2005116405 A1 | 12/2005 |
| WO | 2010123413 A1 | 10/2010 |

OTHER PUBLICATIONS

PCT International Search Report and Written Opinion (PCT/SE2011/000243) dated Sep. 3, 2012 (11 pages).

* cited by examiner

GAS TURBINE ENGINE COMPONENT

CROSS-REFERENCE TO RELATED APPLICATION

This application claims priority to, and is a National Phase of, International Application No. PCT/SE2011/000243, filed on Dec. 22, 2011, which application is hereby incorporated by reference in its entirety.

TECHNICAL FIELD

Disclosed herein is a gas turbine engine component. An annular load transfer structure is positioned internally of an inner ring of the component for transferring loads between elements connecting the inner ring with an outer ring and a bearing structure for a turbine shaft positioned centrally in the component. A gas turbine engine may comprise such a component.

BACKGROUND

An axial gas turbine engine, such as an aircraft "jet-engine", generally comprises an air inlet, a compressor section, a fuel combustion chamber, a turbine section, one or several rotatable drive shafts connecting corresponding compressors and turbines, an exhaust outlet and structures for supporting the drive shafts and for mounting the engine to e.g. an aircraft.

Typically, the supporting structures are static parts that include an inner shell or ring, for connection to bearings and a centrally located drive shaft, and an outer shell or ring, for connection to e.g. an engine casing, and where circumferentially distributed elements (struts, vanes) extend between and connect the inner and outer shells/rings. The supporting structures are designed to be capable of transferring loads between the drive shaft and the engine casing. An axial gas flow through the engine is allowed to flow between the elements which normally are aerodynamically designed. Supporting structures of the type discussed here are exposed to rather extreme balance loads and thermally generated loads.

The part of the supporting structure positioned inside of the inner ring, i.e. the part that transfer loads between the shaft bearing seats and the inner ring, includes normally an annular load transferring wall-shaped structure that is fastened to an inner side of the inner ring and that extends inwards in a radial direction towards the shaft bearings. Typically, this annular load transferring structure extends both radially and axially as to form a cone-shaped member, such as the bearing cones shown in US 2008/134688 and US 2008/022692.

Different designs of inner load transferring structures are known and these can be divided into open and closed structures, where the term "open" refers to the possibility to allow for inspection (to detect damages etc.). A conventional bearing cone normally forms an open structure that can be inspected from both sides. EP 1482130 shows an example of an at least partly closed structure. Closed structures can more easily be designed to withstand high loads but since the possibility of inspecting load-carrying parts is highly desired, in particular in aircraft applications, open structures are generally preferred. In aircraft applications it is also important to reduce the weight of the structures used.

Another known open annular load transferring structure comprises first and second parallel annular beam elements that are connected to the inner side of the inner ring at an axial distance from each other. The forward/upstream annular beam is in turn connected to the shaft bearing seat. A number of circumferentially distributed ribs are provided that connect the two annular beam elements for the purpose of preventing them from being bent in an axial direction and thus retaining the shape of the elements. In many cases this open structure works well but it has been discovered that in some applications this design leads to very high local stresses that may affect the durability of the entire supporting structure.

There is still a need for improvements regarding inner annular structures of the above type, in particular there is a need to lower the weight and to improve the durability.

SUMMARY

A supporting structure for a gas turbine engine is disclosed that exhibits improved durability compared to conventional structures.

A gas turbine engine component comprises an outer ring, an inner ring, and a plurality of circumferentially spaced elements extending between the inner ring and the outer ring, wherein a primary gas channel for axial gas flow is defined between the elements, wherein the component has an inlet side for gas entrance and an outlet side for gas outflow, and an annular load transfer structure for transferring loads between said elements and a bearing structure for a turbine shaft positioned centrally in the component, wherein the annular load transfer structure extends circumferentially along an inner side of the inner ring and also inwards in a radial direction of the component, said annular load transfer structure having a first portion and a second portion, wherein the first portion is located closer to the inner ring than the second portion.

The first portion, at least along a part of the circumference, is inclined in the radial direction in relation to the second portion, wherein the two inclined portions are connected in a connection zone between the inclined portions, and wherein a radial and/or axial position of the connection zone varies along the circumference such that the radial and/or axial position of the connection zone in a location that circumferentially corresponds to a first of said elements, i.e., in a first circumferential location, is radially and/or axially different from the radial and/or axial position of the connection zone in-between the first element and an adjacent second element, i.e. in a second circumferential location. An annular load transfer hub part designed in this way will acquire a contoured, waved or corrugated shape which is capable of forming a very stiff wall structure that, compared to, e.g. conventional structure bearing cones, is more capable of distributing the radial load from the elements/vanes over a larger area as well as of redirecting a portion of the radial load into a tangential direction which enhances the circumferential distribution of the radial load. This way very high local stresses can be avoided which improves the durability of the entire component. The detailed design of the connection zone depends on the application; in some applications it may be favourable to make use of an axial difference only between the circumferential locations, in others it may be favourable to make use of irregular radial and/or axial position differences that differ between different vanes, etc. How to design the connection zone over the circumference in a particular application depends, for instance, on the angle between the bearing position and the inner ring as well as on the direction and magnitude of the forces to be transferred through the component.

Moreover, the second portion of the load transfer structure is typically welded to another more centrally located part for connection to the shaft bearing, and in such a welding the material need to have an even thickness. Since the minimum thickness of such a piece of material is determined by the maximum local stresses, the thickness can be significantly reduced by improving the distribution of the load. Thus, the present invention also leads to significant possibilities of making use of a thinner material in the wall shaped part. In turn, this leads to a lower weight of the component.

In an advantageous embodiment of the invention the radial position of the connection zone is more distant from a center point of the component in the first circumferential location than in the second circumferential location. In an advantageous embodiment of the invention the connection zone in the first circumferential location is located axially downstream of the connection zone in the second circumferential location. A combination of the two embodiments mentioned above provides for an advantageous load distribution in, for instance, the case where the elements/vanes of the component are positioned downstream of the shaft bearing. In an embodiment the connection zone extends along a substantially straight line between the first and second circumferential locations. This provides for an advantageous and controlled distribution of the loads. In an embodiment the radial and/or axial position of the connection zone in a location that circumferentially corresponds to the second element is similar to the radial and/or axial position of the connection zone in the location that circumferentially corresponds to the first element. This gives a symmetric area between these two elements.

In an embodiment the shaft bearing structure is positioned in an axial position forward of the element in the primary gas flow direction through the component and that the second portion is inclined in relation to the radial direction towards the bearing structure. Preferably, the connection zone between the first and second portions is substantially closer to the inner ring than to the bearing structure. Such a design is suitable for, for instance, turbine rear frame.

In an embodiment the annular load transfer structure is provided with a plurality of circumferentially spaced load carrying members arranged at an outlet side of the first portion of the annular load transfer structure to form a load carrying connection between the annular load transfer structure and the elements via the inner ring. By supporting the first portion with the load carrying members it is possible to distribute the load more uniformly than with known open structures. This way the load is distributed over some axial length of the load carrying member and is also transferred at least in part directly to the second portion, via the connection zone. An overall effect of such a load distribution and transfer is that the load carrying members contribute to the advantageous effects achieved by the radial and/or axial shift of the connection zone. In an embodiment the connection zone forms a polygonal form as projected onto a plane perpendicular to the axial direction of the component. This gives a symmetric and stiff device.

The present disclosure also relates to a gas turbine engine comprising a component of the above type. In a further embodiment, the gas turbine engine is arranged for propulsion of an aircraft.

BRIEF DESCRIPTION OF DRAWINGS

In the description given below reference is made to the following figures, in which.

DESCRIPTION OF EXAMPLE EMBODIMENTS

Figure 1:
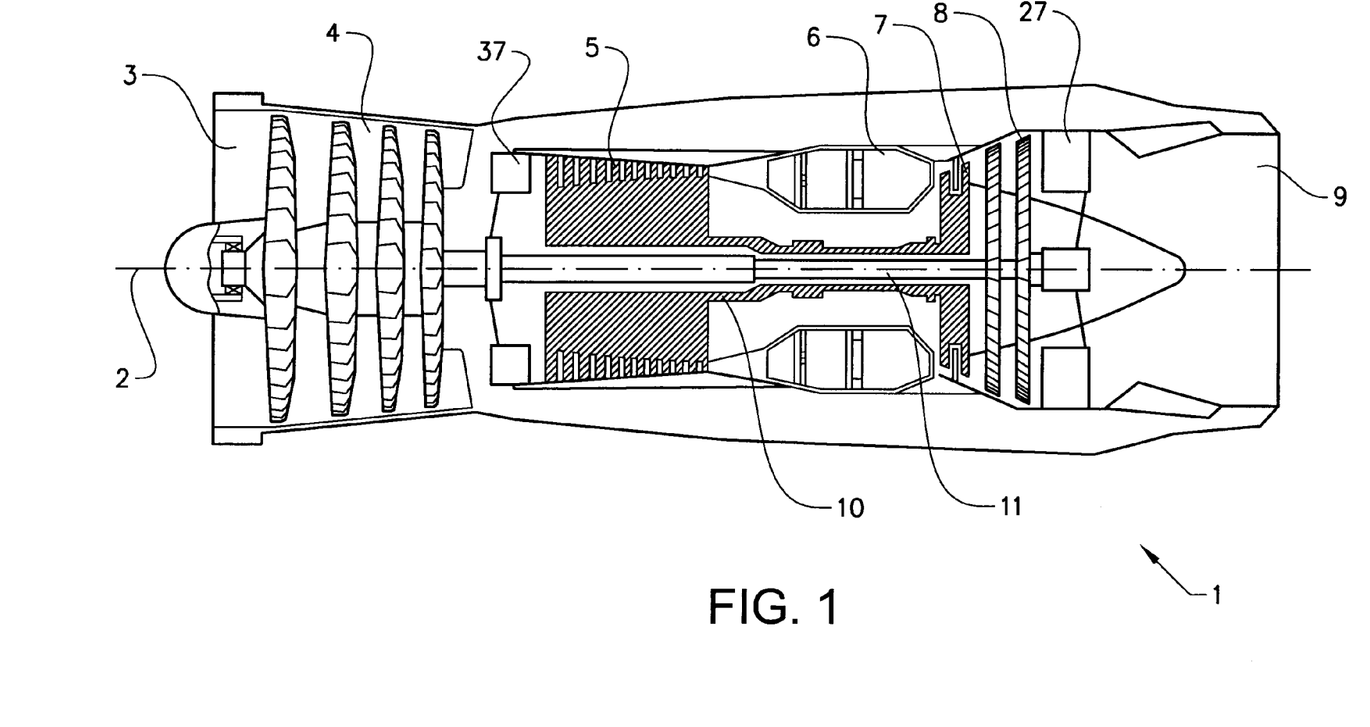
FIG. 1 shows, in a schematic overview, an axial flow aircraft gas turbine engine provided with a gas turbine engine component.

FIG. 1 shows, in a schematic overview, an axial flow aircraft gas turbine engine 1 provided with supporting structures 27, 37. In general, the gas turbine engine 1 shown in FIG. 1 is of conventional construction and comprises, in axial flow series, an air intake 3, a low pressure compressor 4, a high pressure compressor 5, combustion equipment 6, a high pressure turbine 7, a low pressure turbine 8 and an exhaust outlet 9. During operation, the high pressure compressor 5 is driven by the high pressure turbine 7 via a first hollow shaft, the high pressure (HP) turbine shaft 10. Similarly, the low pressure compressor 4 is driven by the low pressure turbine 8 via a second hollow shaft, the low pressure (LP) turbine shaft 11, which is coaxially disposed within the first turbine shaft 10. A common axis 2 is also shown.

The gas turbine engine 1 operates, in general, in a conventional manner whereby air drawn in through the air intake 3 is compressed by the low pressure compressor 4 before passing into the high pressure compressor 5 where it is further compressed. The compressed air then flows into the combustion equipment 6 where it is mixed with fuel and the mixture combusted. The resultant hot combustion products then expand through the high and low pressure turbines 7, 8 before being exhausted to the atmosphere through the exhaust outlet 9. The engine 1 further comprises a rear supporting structure 27 and a front supporting structure 37 for supporting the drive shafts and for mounting the engine to an aircraft.

The following description will refer to the rear supporting structure 27. Such a supporting structure is commonly referred to as Turbine Rear Frame (TRF), Turbine Exhaust Case or Tail Bearing Housing.

Generally, rear support structures in jet engines support one or two shafts using roller bearings, i.e. only radial load is transmitted through the structure (axial load only at shaft forward bearing). The load is transmitted through an inner support structure (support cone) to an inner hub connected to an outer structure (shroud) by means of radial elements. In order to reduce aerodynamic drag or to straighten the outlet angle of the main gas flow leaving the low pressure turbine, these elements are usually covered with an airfoil structure or made integral to the structure. Integrated airfoils or vanes are sometimes denoted "struts". In the example described below the term "structural vanes" is used. Structural vanes are capable of supporting both aerodynamic loads as well as a combination of structural and thermal induced loads. Most of the modern jet engines utilize such vanes in ring-vane-ring components, such as the rear supporting structure 27.

Figure 2:
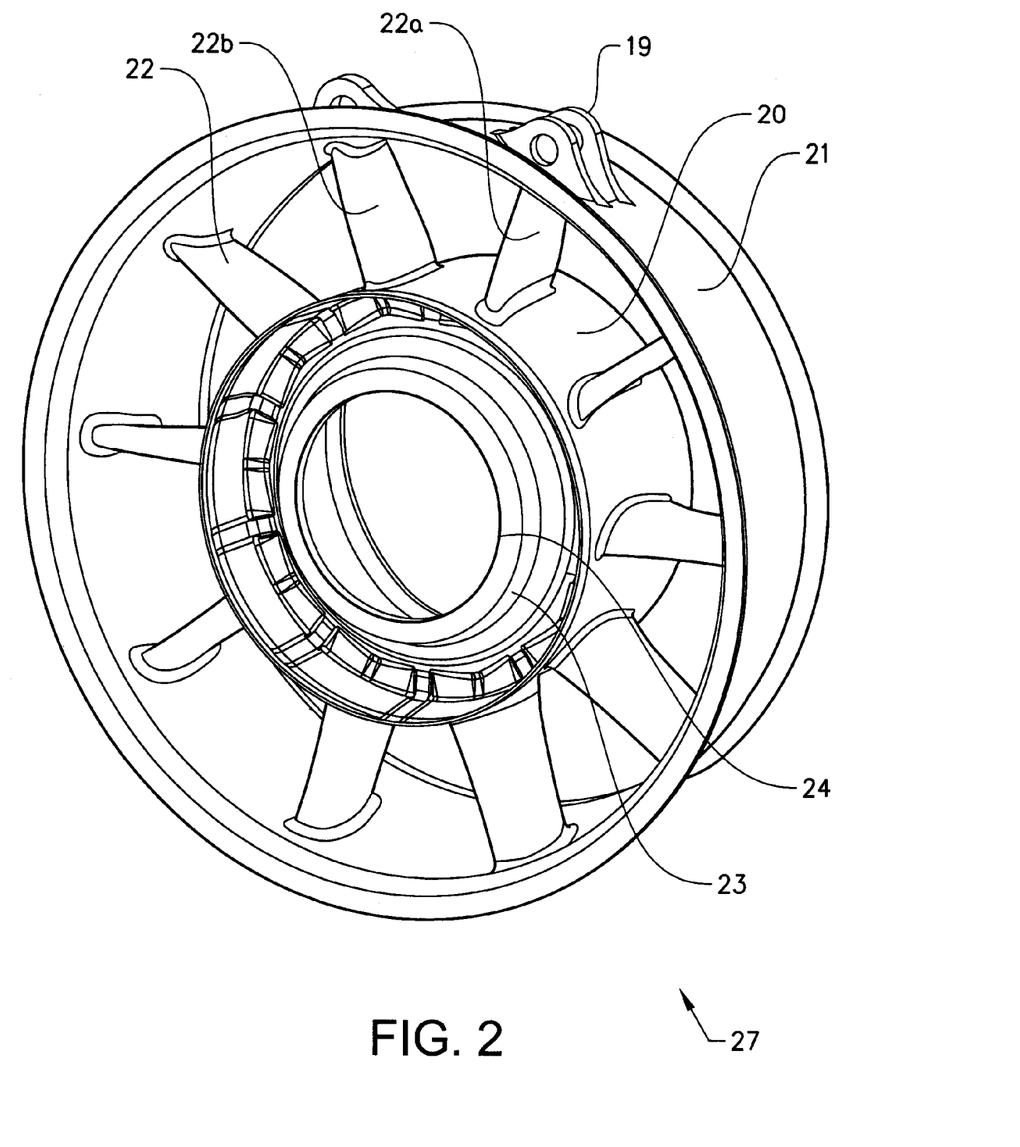
FIG. 2 shows, in a perspective front view, an embodiment of the gas turbine engine component.
Figure 3:
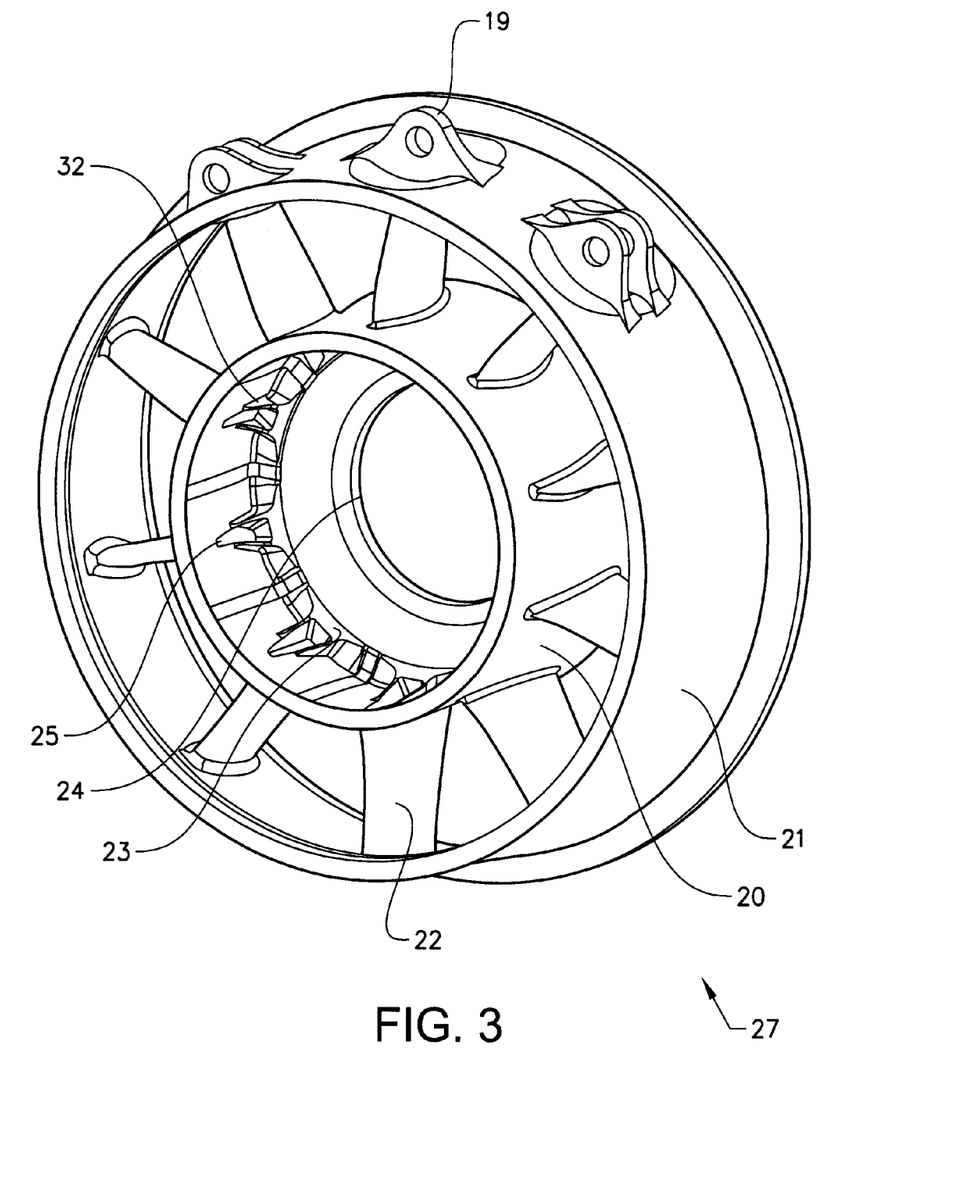
FIG. 3 shows, in a perspective rear view, the embodiment according to FIG. 2.

FIGS. 2 and 3 show perspective front and rear views, respectively, of an embodiment, the rear supporting structure 27, comprising an inner annular member or ring 20 in the form of an inner housing or hub for receiving the second turbine drive shaft 11 and an outer annular member or ring 21, wherein the two annular members 20, 21 are concentrically arranged around the common axis 2. The supporting structure 27 further comprises a plurality of circumferentially spaced structural vanes 22 that extend in a radial direction and connect the inner and outer annular members 20, 21. The vanes 22 define gas flow passages between the rings 20, 21 and, in the example shown, each radial element 22 has an airfoil shape in cross section and is structurally integrated in the supporting structure 27. FIG. 2 shows a gas inlet side of the component 27, whereas FIG. 3 shows a gas outlet side. FIG. 2 further indicates a first element/vane 22*a* adjacent to a second element/vane 22*b*.

An annular load transfer structure 23 is positioned internally of the inner ring 20 for transferring loads between the vanes 22 and a bearing structure 24 for the turbine shaft 11 which is positioned centrally in the component 27. As shown in FIGS. 2 and 3, the annular load transfer structure 23 extends circumferentially along an inner side of the inner ring 20 and inwards in a radial direction of the component 27. The annular load transfer structure 23 also extends axially towards the shaft bearing structure 24 that is positioned in an axial position forwards/upstream of the vanes 22 in a primary gas flow direction through the component 27.

Figure 8:
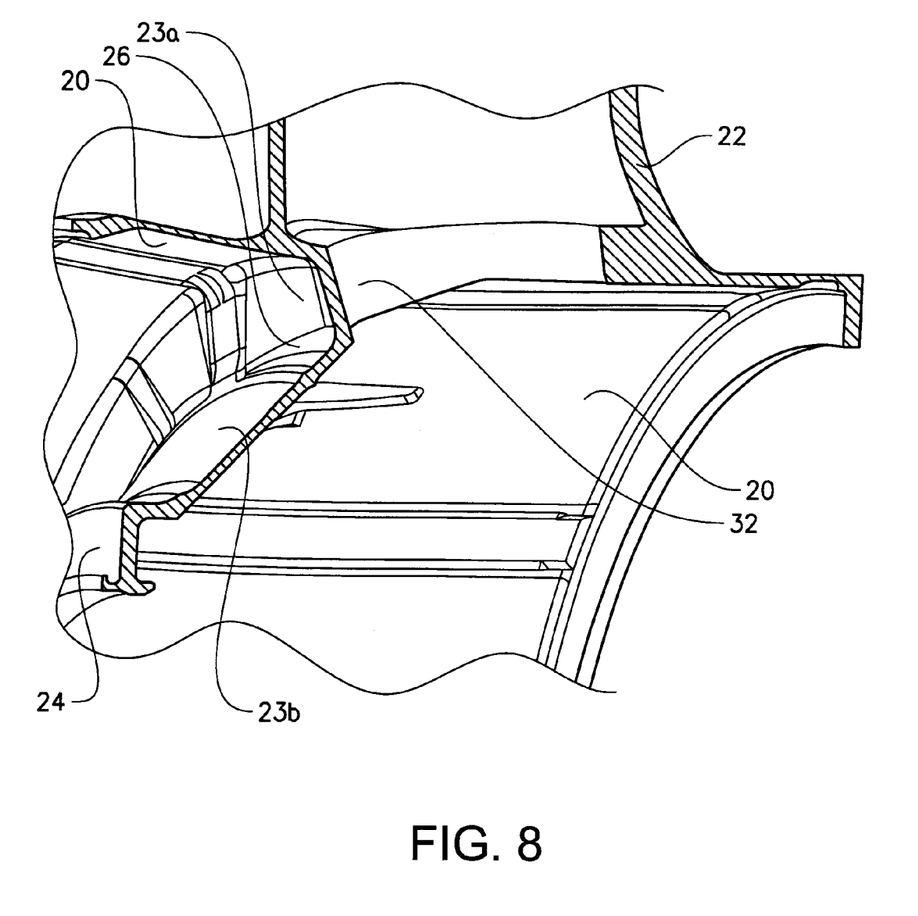
FIG. 8 shows a different view of the section A-A.

FIG. 3 shows that the annular load transfer structure 23 is provided with a plurality of circumferentially spaced load carrying members 32. These, and the annular load transfer structure 23, are further described below. As can be seen in FIG. 3 (and in e.g. FIGS. 5-6), a central part 25 of an underside of each vane protrudes through the inner side of the inner ring 20. As shown in FIGS. 2, 3, and 8 the outer ring 21 is provided with engine mounts 19.

Figure 4:
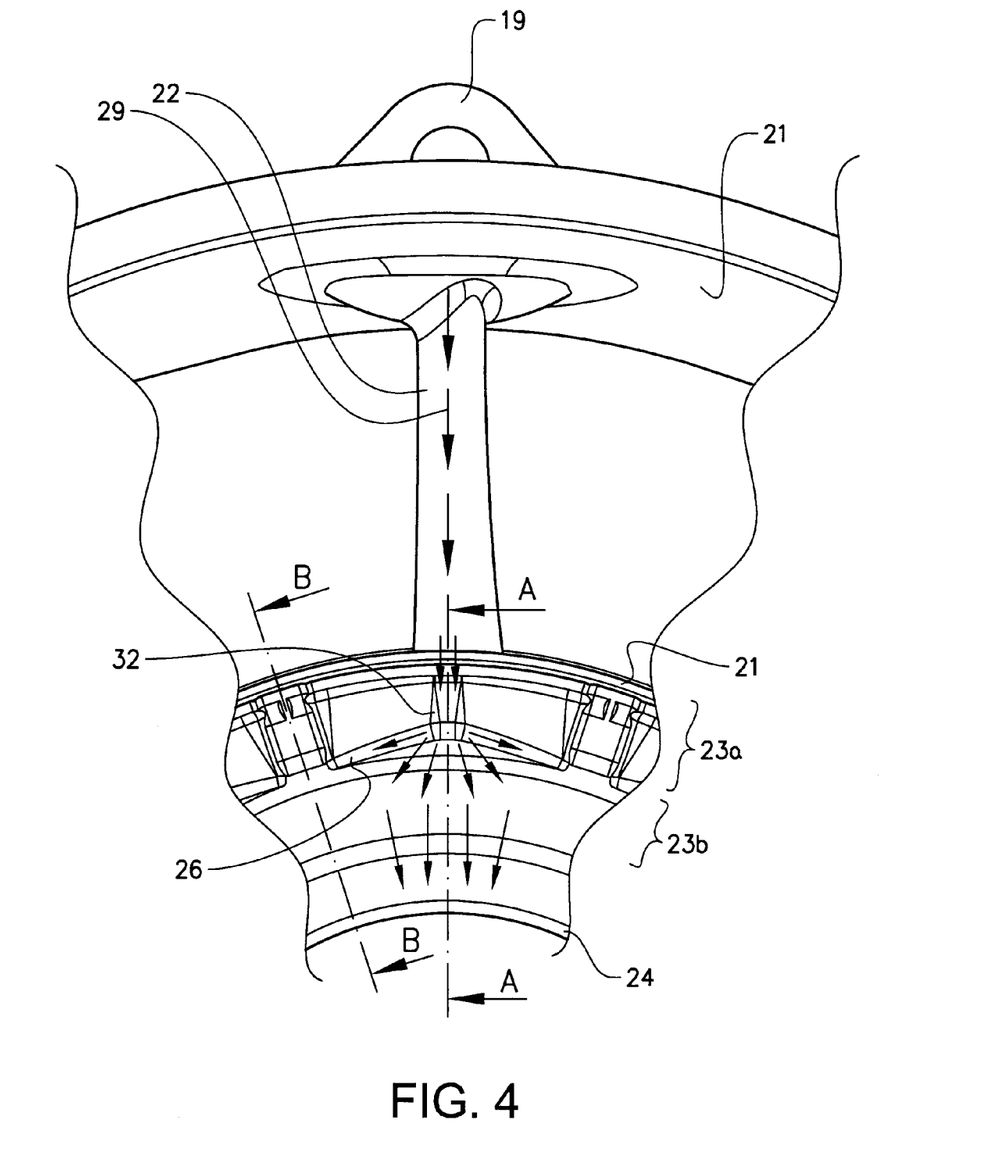
FIG. 4 shows an upper part of front side of the embodiment according to FIG. 2.
Figure 5:
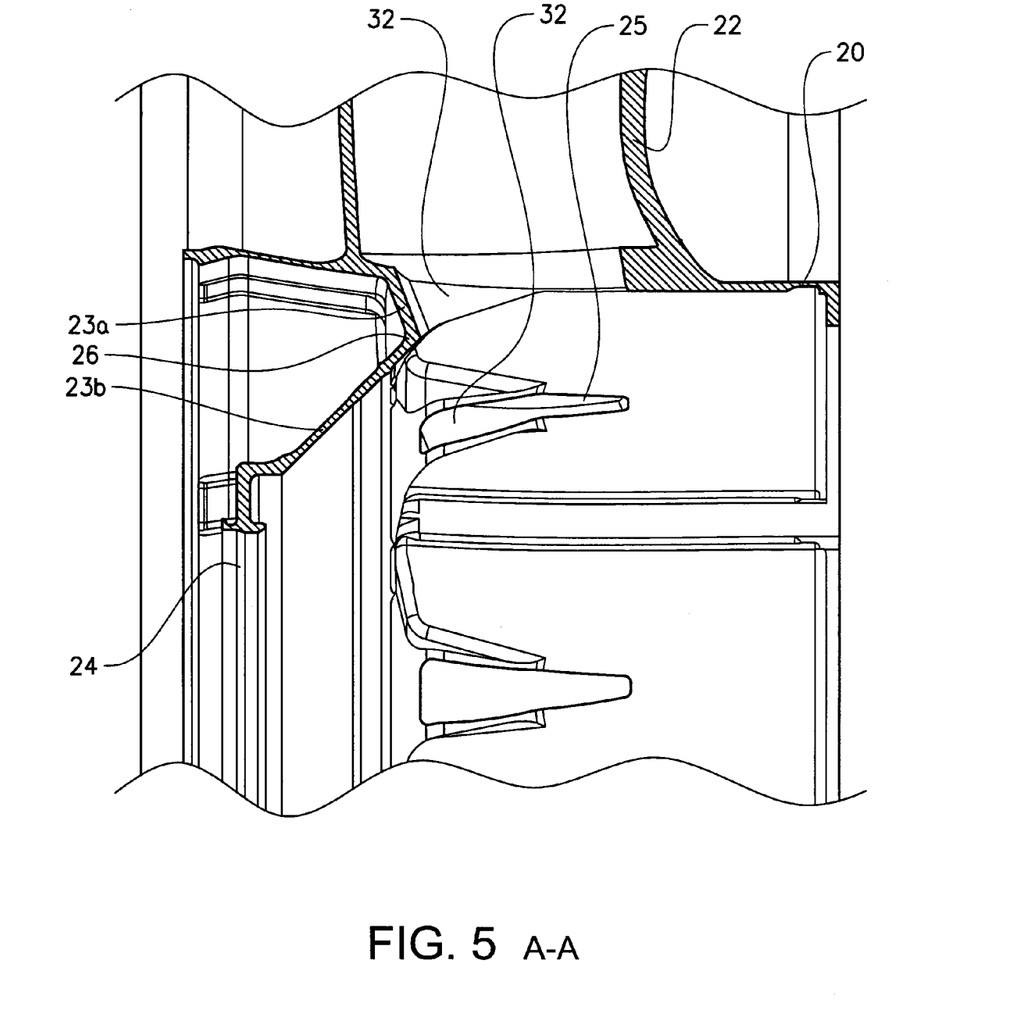
FIG. 5 shows an axial cross section A-A in a first circumferential location A according to FIG. 4.
Figure 6:
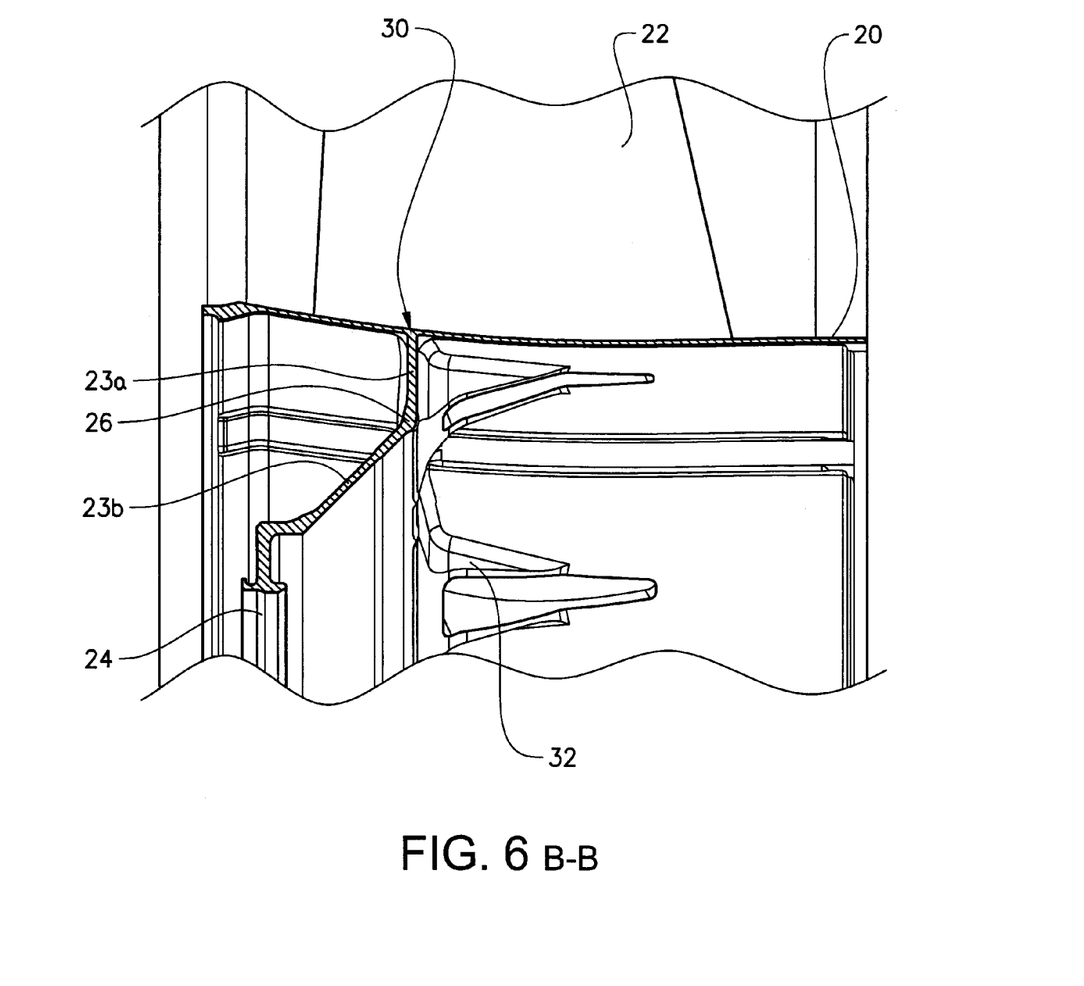
FIG. 6 shows an axial cross section B-B in a second circumferential location B according to FIG. 4.
Figure 7:
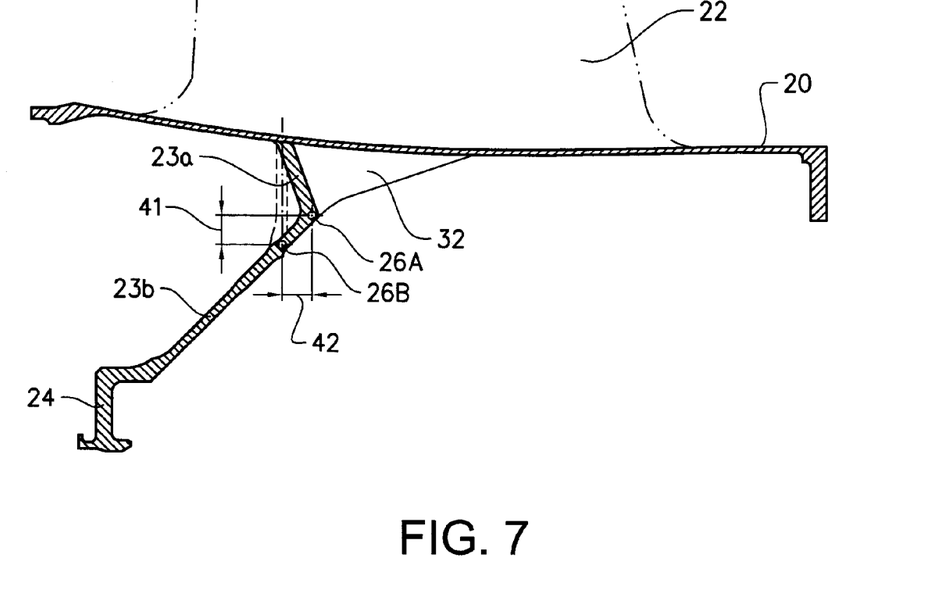
FIG. 7 shows the principle difference of the annular load transfer structure 23 between the sections A-A and B-B.

FIGS. 4-8 show the annular load transfer structure 23 in more detail. FIG. 4 shows an upper part of the gas inlet side of the component 27. FIG. 5 shows an axial cross section A-A in a first circumferential location A according to FIG. 4. FIG. 6 shows an axial cross section B-B in a second circumferential location B according to FIG. 4. FIG. 7 shows the principle difference of the annular load transfer structure 23 between the sections A-A and B-B. FIG. 8 shows a different view of the section A-A. As shown in FIGS. 4-8 the annular load transfer structure 23 has a first portion 23*a* and a second portion 23*b*, wherein the first portion 23*a* is located closer to the inner ring 20 than the second portion 23*b*. The first portion 23*a* is connected to the inner ring 20 in a point/location 30 (see FIG. 6). The two portions 23*a*, 23*b* exhibit a substantially straight axial cross section and the first portion 23*a* is inclined in the radial direction in relation to the second portion 23*b* (see FIGS. 5-8). The two inclined portions 23*a*, 23*b* are connected in a connection zone 26 that extends between the inclined portions 23*a*, 23*b* and that forms bend of the annular load transfer structure 23.

Arrows 29 in FIG. 4 indicate a load that is transferred in a radial direction from the engine mounting 19, via the vane 22 to the annular load transfer structure 23 and further towards the bearing structure 24. At the connection zone 26 the load is distributed in a tangential/circumferential direction before it is further transferred radially inwards to the bearing structure 24. This distributional effect is achieved because a radial and an axial position of the connection zone 26 varies along the circumference such that the radial and/or axial position of the connection zone 26 in a location that circumferentially corresponds to a first of the vanes 22, i.e. in a first circumferential location A (corresponding to A-A in FIG. 4), is radially and axially different from the radial and/or axial position of the connection zone 26 in-between the same vane 22 and an adjacent second vane, i.e. in a second circumferential location B (corresponding to B-B in FIG. 4). In particular, the radial position of the connection zone 26 is more distant from a center point of the component 27 in the first circumferential location A than in the second circumferential location B. Moreover, the connection zone 26 in the first circumferential location A is located axially downstream of the connection zone 26 in the second circumferential location B.

In the described embodiment, the connection zone 26 extends along a substantially straight line between the first and second circumferential locations A, B. Further, the radial and/or axial position of the connection zone 26 in a location that circumferentially corresponds to the second vane/element, i.e. a vane adjacent to the first vane, is similar to the radial and/or axial position of the connection zone 26 in the location that circumferentially corresponds to the first vane/element. This means that that the connection zone 26 is symmetric in the area of the two adjacent vanes. As can be seen in, for instance, FIGS. 5-6, the shaft bearing structure 24 is positioned in an axial position forward/upstream of the vanes 22 in the primary gas flow direction through the component 27 and that the second portion 23*b* is inclined in relation to the radial direction towards the bearing structure 24. As shown in, e.g., FIG. 8, the connection zone 26 between the first and second portions 23*a*, 23*b* is substantially closer to the inner ring 20 than to the bearing structure 24. FIG. 8 also shows that the vanes 22 are hollow and, thus, that the vanes 22 transfer the load. via side walls.

In the embodiment described here the second circumferential location B is in the middle between two adjacent vanes 22 and the annular load transfer structure 23 is circumferentially symmetric so the vane 22 shown in FIG. 4 could be any of the vanes 22 (even if all vanes 22 are not positioned straight inwards of an engine mount 19).

The principle of the inventive concept is shown in FIG. 7 where the position of the connection zone 26 in a location that circumferentially corresponds to a vane 22 is denoted 26A, whereas the position of the connection zone 26 in-between the same vane 22 and an adjacent second vane is denoted 26B. The design of the first and second portions 23*a*, 23*b* of the annular load transfer structure 23 in a location that circumferentially corresponds to the vane 22 is shown as a sectional part and the design of the first and second portions 23*a*, 23*b* in-between two adjacent vanes is indicated. As shown in FIG. 7, there is both a radial shift 41 and an axial shift 42 between the two positions 26A, 26B of the connection zone 26, i.e. the two positions inwards of a vane 22 and in the middle between two adjacent vanes 22, respectively. In the second circumferential location B, i.e. between the vanes 22, the connection zone 26 (26B) is positioned inwards and upstream of the connection zone 26 (26A) in the first circumferential location A, i.e. straight inwards of a vane 22.

The load transferred to the annular load transfer structure 23 from the vanes/elements 22 is partly re-directed tangentially (see FIG. 4) when it reaches the connection zone 26 between the inclined portions 23*a*, 23*b* (i.e., the point 26A of the connection zone 26) because the load follows partly the connection zone 26 that is directed inwards and upstream of the component 27.

The connection zone 26 forms in this example a polygonal form as projected onto a plane perpendicular to the axial direction of the component 27. This can be seen in FIG. 2 (together with FIGS. 4-8).

FIG. 5 shows, besides, e.g., the inclined portions and the connection zone 26, some of the load carrying members 32 arranged circumferentially spaced at the outlet side of the first portion 23a. The load carrying members 32 form a load carrying connection between the annular load transfer structure 23 and the vanes/elements 22 via the inner ring 20.

The load carrying members 32 are arranged in a set of pairs, wherein each of said set of pairs are positioned radially inwards of a corresponding vane 22 located on an opposite, outer side of the inner ring 20 such that a load can be transferred in a substantially straight radial direction between a certain pair of load carrying members 32 and an element 22 corresponding to said pair. This can be seen in FIG. 4. Since the elements 22 in this case are hollow the load carrying members 32 are arranged such that an axial extension of the load carrying members 32 in each of the pairs along the inner ring 20 substantially corresponds to an axial extension of a first and second side, respectively, of the corresponding element 22 along the opposite side of the inner ring (20). This means that the load can be transferred in a straight radial direction between a side of an element 22 and a corresponding load carrying member 32. It does not mean, however, that the load carrying members 32 extend axially along the whole length of the element side but that an individual load carrying member 32, which is plate-like, substantially follows a portion of the element side. As can be seen in FIG. 4, the section A-A shown in FIG. 5 is taken in-between two load carrying members 32 forming one of the pairs.

A significant portion of the load transferred between the vanes 22 and the annular load transfer structure 23 is transferred via the load carrying members 32 directly to the connection zone 26 and the second portion 23b. FIG. 5 shows also that the first portion 23a extends from a position in the vicinity of a leading edge of the vanes 22, i.e. the upstream edge of the vanes 22, towards the connection zone 26 which is closer to the leading edge of the vanes 22 than to a trailing edge of the vanes, i.e. the downstream edge of the vanes 22.

FIG. 6 shows the section B-B indicated in FIG. 4. By comparing FIGS. 5 and 6 it can be seen that the position of the connection zone 26 differs. In FIG. 5 the first portion 23a is inclined in a downstream direction, whereas in FIG. 6 it extends in a substantially straight radial direction. Thus, the first portion 23b has a varying inclination in the radial direction corresponding to the variation of the position of the connection line 26.

As can be seen in, e.g., FIG. 6 the annular load transfer structure 23 is a wall structure, i.e., a relatively thin structure that substantially extends in two dimensions (but may of course form three-dimensional parts, such as a cone). The thickness is, however, sufficient for carrying a substantive load, and the wall structure saves weight in relation to more solid structures. Also the load carrying members 32 are wall structures.

FIG. 8 shows the section A-A in a view that also shows a part of the upstream side of the first and second portions 23a, 23b of the annular load transfer structure 23.

The invention is not limited by the embodiments described above but can be modified in various ways within the scope of the claims. For instance, in the described embodiment the position of the connection zone 26 is varied by varying the inclination of the first portion 23a and the radial and/or axial length of both the first and the second portions 23a, 23b. However, in some applications it may be useful to (also or instead) vary the inclination of the second portion 23b. The position of the connection zone 26 may also be varied by varying the thickness of the annular load transfer wall structure 23. Considering the center of the connection zone 26 to be in the center of the wall structure, the center point of the connection zone 26 will be shifted by applying additional material on one side of the wall structure. This may at least be used to generate an axial shift of the connection zone 26. Addition of material is, however, usually undesired since weight is added.

As a complement or alternative, the position of the connection zone 26 can be varied along the circumference by axially varying the point of connection 30 between the first portion 23a and the inner ring 20 (FIG. 6) and thereby varying the axial position of the first portion 23a. For instance, by moving the point of connection 30 in an upstream (downstream) direction, i.e. to the left (right) in FIG. 6, also the connection zone 26 will move in an upstream (downstream) direction if the inclination of the first portion 23a is retained. An axial movement of the connection zone 26 can also be effected with some change of the inclination of the first portion 23a. The radial position of the connection zone 26 in such an upstream or downstream movement of the entire first portion 23a can be retained by adapting the inclination and length of the second portion 23b, or be changed by adapting lengths and inclinations of any or both of the two portions 23a, 23b.

How much the connection zone 26 should be varied between its outer and inner positions, or between its downstream and upstream positions, to achieve a sufficient effect depends on the application. A significant effect can normally be achieved when the difference of the radial and/or axial position of the connection zone 26 between the first and the second circumferential locations A, B is at least half of a mean thickness of the annular load transfer structure 23 at the connection zone 26. In some applications, this difference should be at least equal to the mean thickness of the annular load transfer structure 23 at the connection zone 26. As can be estimated from FIG. 7, this difference, i.e. the radial and axial shifts 41, 42, is in the described example around two times the mean thickness of the annular load transfer structure 23 at the connection zone 26.

Further, the invention is not limited to the rear frame structure (TEC/TRF) 27 as exemplified above. It is also applicable to other supporting structures in a gas turbine engine such as the front frame (inlet frame) 37, an intermediate case (IMC) or a turbine mid structure (TMF.TMS). Further, the invention is applicable to stationary gas turbines (power generators) as well as flying jet engines.

It should be noted that when it is said that a location "circumferentially corresponds to that of a vane" or similar, it means that the location approximately corresponds to that of the vane since each vane has a certain circumferential extension that varies along the axial direction of the component 27 (because of the air-foil shape) and since each vane also is curved and slightly inclined in the axial direction. The term wall shaped part (wall structure) is used to describe a part that generally extends in two dimensions, in this case circumferentially and radially (portion by portion), but that may form three-dimensional structures. As exemplified above, a wall shaped part may very well be bent, have portions that extend in different directions, comprise various other parts, etc.

That a part, such as the annular load transfer structure, is said to extend in one direction, e.g. a radial direction, does not exclude that it also extends in another direction, e.g. an axial direction.

The invention claimed is:

1. A gas turbine engine component, comprising:
   an outer ring;
   an inner ring;
   a plurality of circumferentially spaced elements extending between the inner ring and the outer ring, wherein a primary gas channel for axial gas flow is defined between the plurality of circumferentially spaced elements, wherein the gas turbine engine component has an inlet side for gas entrance and an outlet side for gas outflow; and
   an annular load transfer structure for transferring loads between said elements and a bearing structure for a turbine shaft positioned centrally in the component;
   wherein:
   the annular load transfer structure extends circumferentially along an inner side of the inner ring and also inwards in a radial direction of the component, said annular load transfer structure having a first portion and a second portion, wherein the first portion is located closer to the inner ring than the second portion;
   the first portion, at least along a part of the circumference, is inclined in a radial direction in relation to the second portion, wherein the two inclined portions are connected in a connection zone between the inclined portions;
   at least one of a radial position and an axial position of the connection zone varies along the circumference such that a position of the connection zone in a first circumferential location that circumferentially corresponds to a first element of said plurality of circumferentially spaced elements is at least one of radially and axially different from at least one of a radial position and an axial position of the connection zone in a second circumferential location in-between the first element and an adjacent second element; and
   wherein the annular load transfer structure is provided with a plurality of circumferentially spaced load carrying members arranged at an outlet side of the first portion of the annular load transfer structure to form a load carrying connection between the annular load transfer structure and the elements; and
   wherein the plurality of circumferentially spaced load carrying members are arranged in sets of pairs, wherein each pair of said sets of pairs are is positioned radially inwards of a corresponding element of the plurality of circumferentially spaced elements located on an opposite, outer side of the inner ring such that a load can be transferred in a substantially straight radial direction between each pair of the sets of pairs and the corresponding element to said pair; and
   wherein an axial extension of the plurality of circumferentially spaced load carrying members in each pair of the sets of pairs along the inner ring corresponds to an axial extension of a first and second side, respectively, of the corresponding element to said pair along the opposite side of the inner ring.

2. The gas turbine engine component of claim 1, wherein the radial position of the connection zone is more distant from a center point of the component in the first circumferential location than in the second circumferential location.

3. The gas turbine engine component of claim 1, wherein the connection zone in the first circumferential location is located axially downstream of the connection zone in the second circumferential location.

4. The gas turbine engine component of claim 1, wherein the connection zone extends along a substantially straight line between the first circumferential location and the second circumferential location.

5. The gas turbine engine component of claim 1, wherein the at least one of the radial and the axial position of the connection zone in the first circumferential location and the at least one of the radial and the axial position of the connection zone in the second circumferential location create a symmetry.

6. The gas turbine engine component of claim 1, wherein the bearing structure is positioned in an axial position forwards of the element in a primary gas flow direction through the component and the second portion is inclined in relation to the radial direction towards the bearing structure.

7. The gas turbine engine component of claim 1, wherein the connection zone between the first portion and the second portion is substantially closer to the inner ring than to the bearing structure.

8. The gas turbine engine component of claim 1, wherein the annular load transfer structure is a wall structure.

9. The gas turbine engine component of claim 1, wherein the difference of the position of the connection zone between the first circumferential location and the second circumferential location is at least half of a mean thickness of the annular load transfer structure at the connection zone.

10. The gas turbine engine component of claim 1, wherein the difference of the position of the connection zone between the first circumferential location and the second circumferential location is at least equal to a mean thickness of the annular load transfer structure at the connection zone.

11. The gas turbine engine component of claim 1, wherein the connection zone forms a polygonal form as projected onto a plane perpendicular to the axial direction of the gas turbine engine component.

12. The gas turbine engine component of claim 1, wherein the plurality of circumferentially spaced load carrying members are disposed radially inwardly of the inner side of the inner ring to form a load carrying connection between the annular load transfer structure and the plurality of circumferentially spaced elements.

13. A gas turbine engine, comprising:
    a component that includes:
    an outer ring;
    an inner ring;
    a plurality of circumferentially spaced elements extending between the inner ring and the outer ring, wherein a primary gas channel for axial gas flow is defined between the plurality of circumferentially spaced elements, wherein the gas turbine engine component has an inlet side for gas entrance and an outlet side for gas outflow; and
    an annular load transfer structure for transferring loads between said elements and a bearing structure for a turbine shaft positioned centrally in the component;
    wherein:
    the annular load transfer structure extends circumferentially along an inner side of the inner ring and also inwards in a radial direction of the component, said annular load transfer structure having a first portion and a second portion, wherein the first portion is located closer to the inner ring than the second portion;

the first portion, at least along a part of the circumference, is inclined in a radial direction in relation to the second portion, wherein the two inclined portions are connected in a connection zone between the inclined portions;

at least one of a radial position and an axial position of the connection zone varies along the circumference such that the position of the connection zone in a first circumferential location that circumferentially corresponds to a first element of said plurality of circumferentially spaced elements is at least one of radially and axially different from the at least one of the radial position and the axial position of the connection zone in between the first element and an adjacent second element that is in a second circumferential location; and wherein the annular load transfer structure is provided with a plurality of circumferentially spaced load carrying members arranged at an outlet side of the first portion of the annular load transfer structure to form a load carrying connection between the annular load transfer structure and the elements and;

wherein the plurality of circumferentially spaced load carrying members are arranged in sets of pairs, wherein each pair of said sets of pairs is positioned radially inwards of a corresponding element of the plurality of circumferentially spaced elements located on an opposite, outer side of the inner ring such that a load can be transferred in a substantially straight radial direction between each pair of the sets of pairs and the corresponding element to said pair; and wherein an axial extension of the plurality of circumferentially spaced load carrying members in each pair of the sets of pairs along the inner ring corresponds to an axial extension of a first and second side, respectively, of the corresponding element to said pair along the opposite side of the inner ring.

14. The gas turbine engine of claim 13, wherein the gas turbine engine is arranged for propulsion of an aircraft.

* * * * *

UNITED STATES PATENT AND TRADEMARK OFFICE
CERTIFICATE OF CORRECTION

| | | |
|---|---|---|
| PATENT NO. | : 9,689,312 B2 | Page 1 of 1 |
| APPLICATION NO. | : 14/366644 | |
| DATED | : June 27, 2017 | |
| INVENTOR(S) | : Roger Sjöqvist | |

It is certified that error appears in the above-identified patent and that said Letters Patent is hereby corrected as shown below:

In the Claims

Column 9, in Line 53, replace "pairs are is positioned" with -- pairs is positioned --.

Signed and Sealed this
First Day of August, 2017

Joseph Matal
*Performing the Functions and Duties of the*
*Under Secretary of Commerce for Intellectual Property and*
*Director of the United States Patent and Trademark Office*